Nov. 8, 1938.     R. L. HIBBARD     2,135,508
CYLINDER BORING MACHINE
Filed April 2, 1937     5 Sheets-Sheet 1

INVENTOR.
ROBERT L. HIBBARD
BY James C. Bradley
ATTORNEYS.

Nov. 8, 1938.   R. L. HIBBARD   2,135,508
CYLINDER BORING MACHINE
Filed April 2, 1937   5 Sheets-Sheet 3

INVENTOR.
ROBERT L. HIBBARD
BY James C. Bradley
ATTORNEY

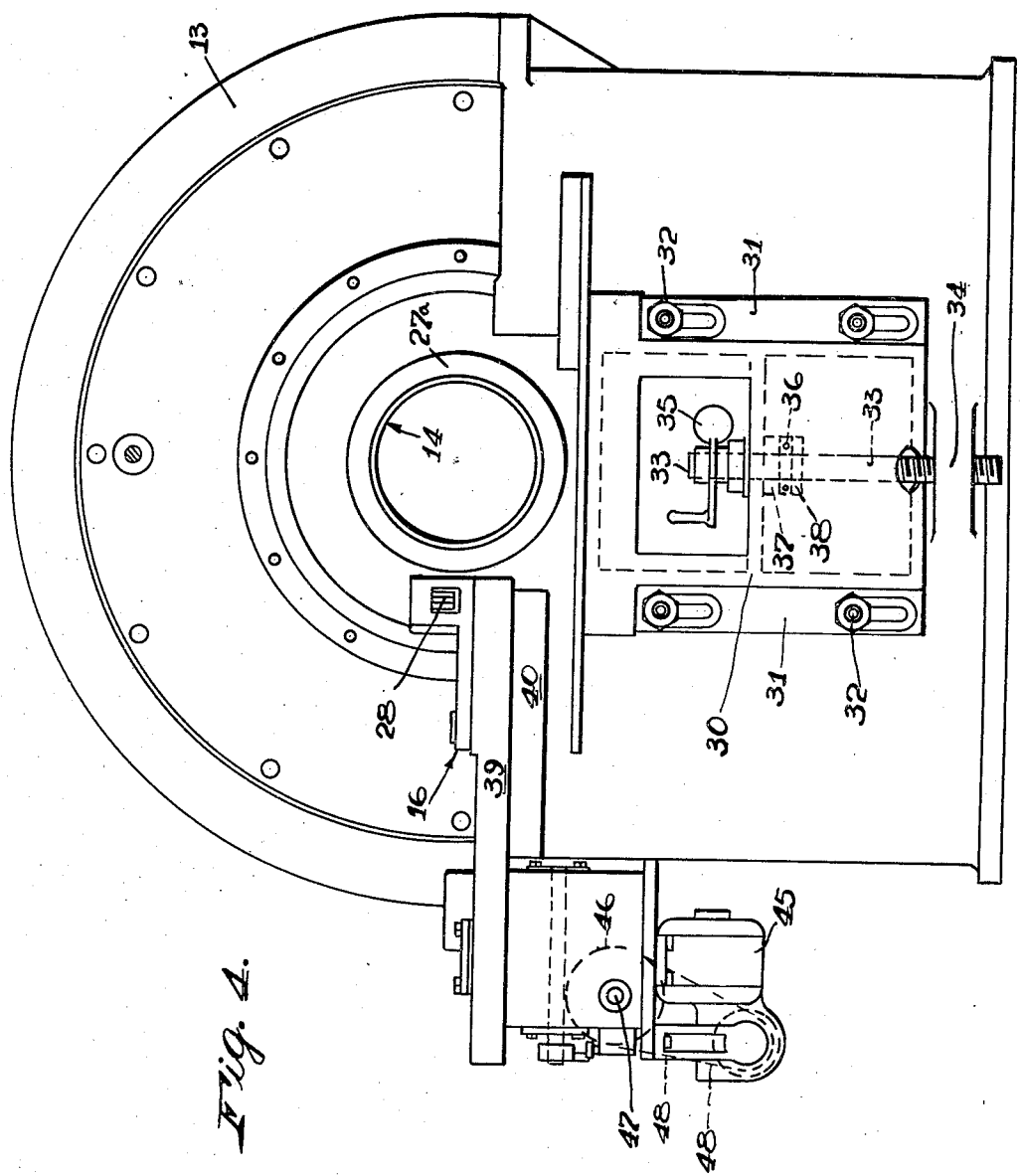

Nov. 8, 1938.　　　　R. L. HIBBARD　　　　2,135,508
CYLINDER BORING MACHINE
Filed April 2, 1937　　　　5 Sheets-Sheet 5

INVENTOR.
ROBERT L. HIBBARD
BY James L. Bradley
ATTORNEY.

Patented Nov. 8, 1938

2,135,508

UNITED STATES PATENT OFFICE 2,135,508

CYLINDER BORING MACHINE

Robert L. Hibbard, Pittsburgh, Pa., assignor of one-half to William K. Stamets, Pittsburgh, Pa.

Application April 2, 1937, Serial No. 134,621

7 Claims. (Cl. 29—27)

Figure 1:
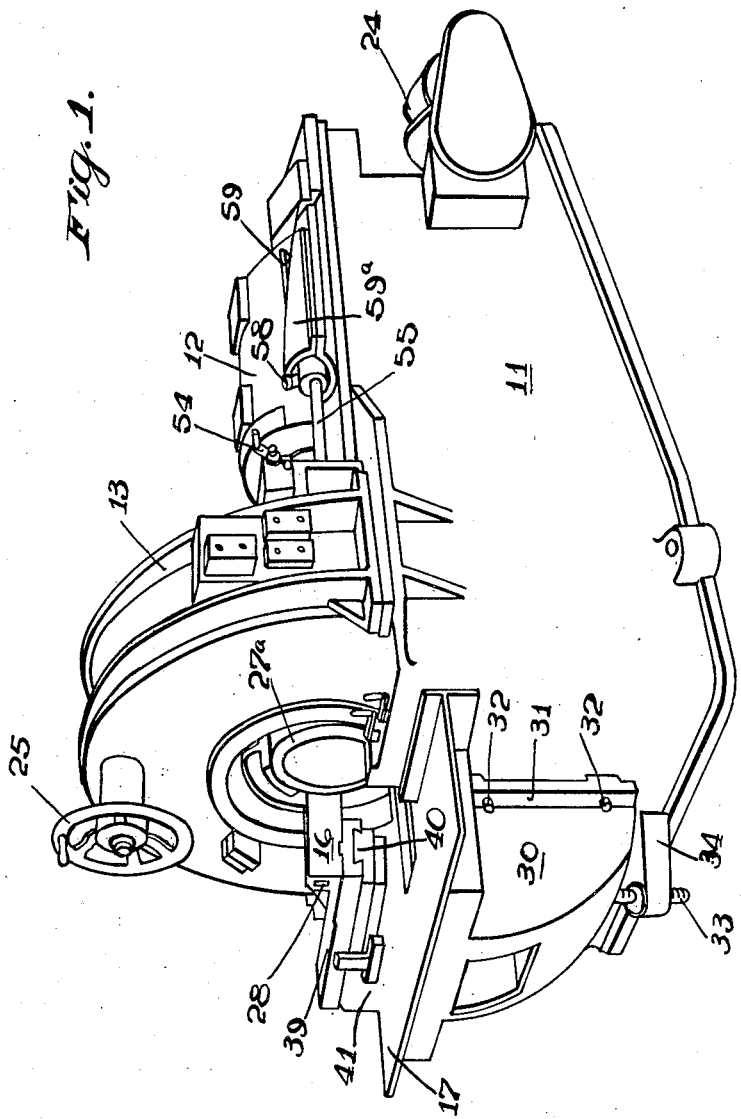
Figure 2:
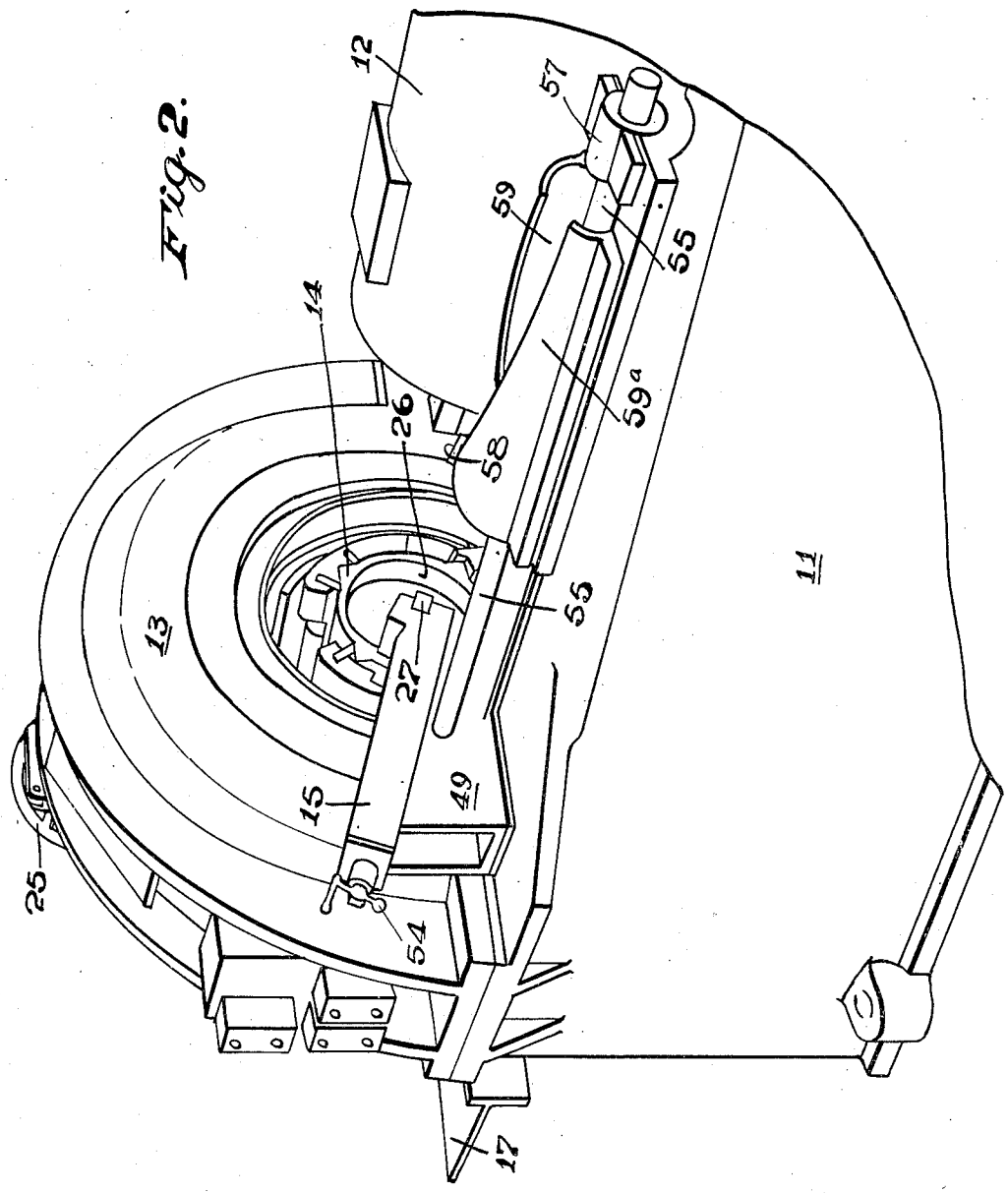
Figure 3:
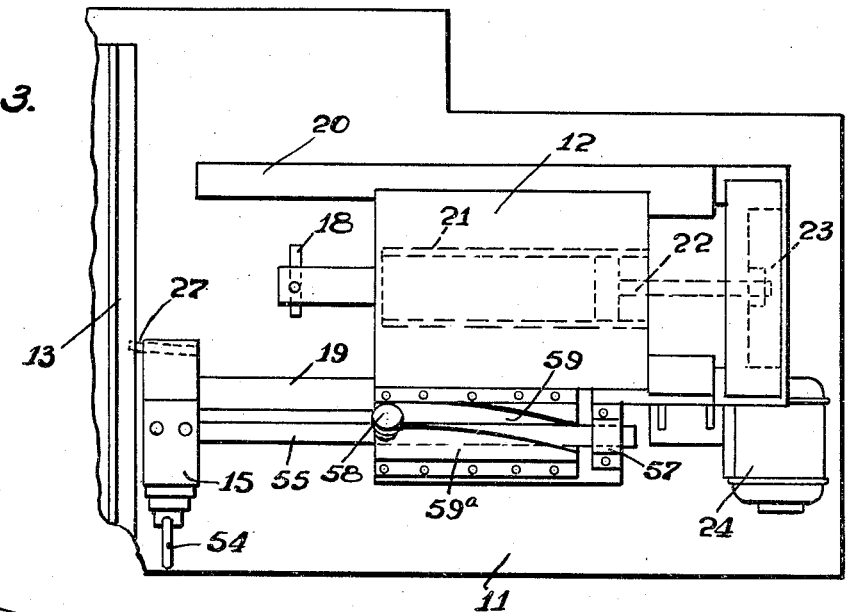
Figure 6:
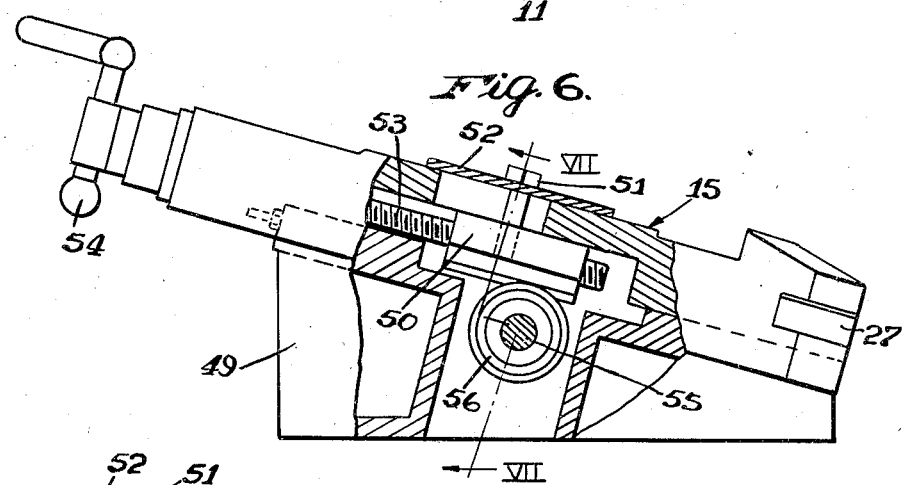
Figure 7:
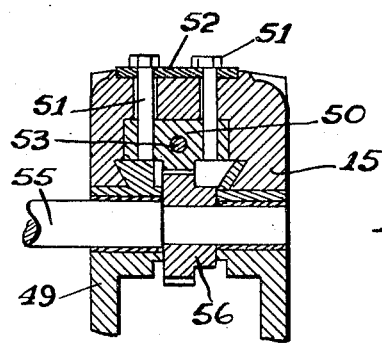
Figure 5:
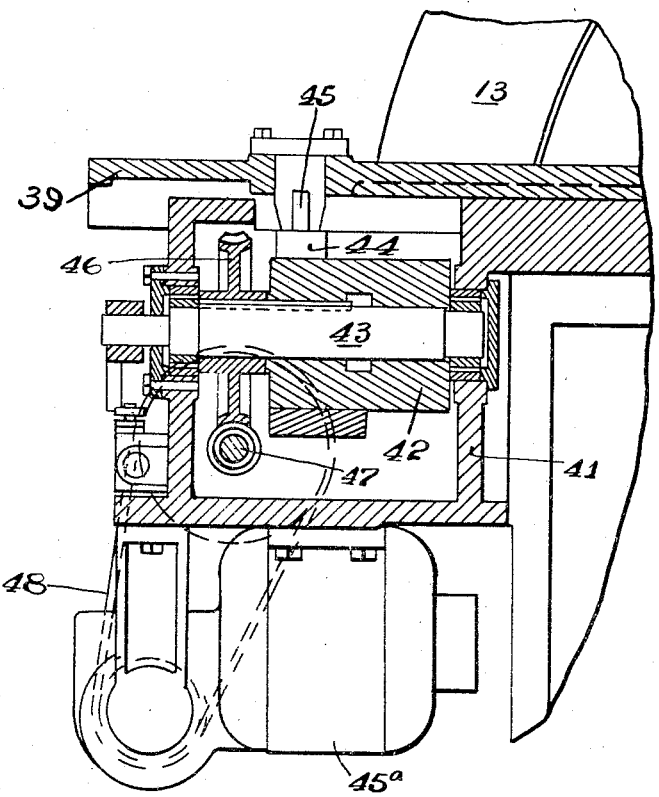
Figure 8:
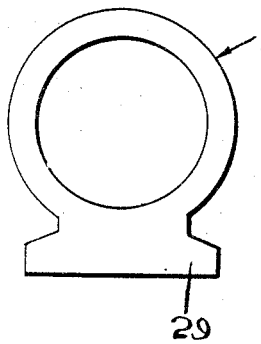
Figure 9:
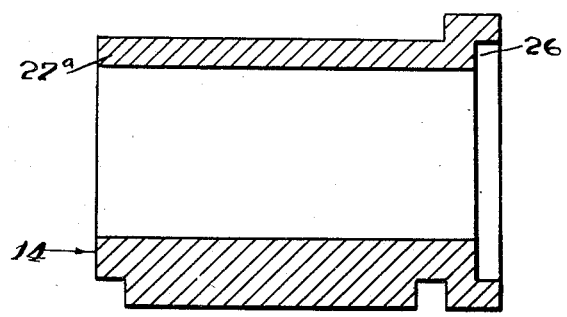

The invention relates to a cylinder boring machine of the type in which the blank is clamped in a chuck and rotated while the tool is advanced therethrough, and which has means for facing or grooving one or both end surfaces of the blank coincident with the boring operation. The invention has for its principal objects the provision of an improved machine of the type specified which has a greater capacity than machines heretofore constructed; which requires a minimum amount of effort on the part of the operators in loading and unloading the machine; and which permits of the reloading of the chuck while the boring tool is being retracted. A further object is the provision of improved means for securing the movement of one of the facing or grooving tools in and out by the reciprocation of the boring tool carriage. One embodiment of the invention is illustrated in the accompanying drawings, wherein:

Figs. 1 and 2 are perspective views of the machine. Fig. 3 is a partial plan view. Fig. 4 is an elevation of the loading end of the machine. Fig. 5 is a detail section through the means for operating the facing tool at the loading end of the machine. Figs. 6 and 7 are detail views of the means for moving the other facing tool, Fig. 6 being a partial side elevation and partial longitudinal section and Fig. 7 being a transverse section on the line VII—VII of Fig. 6. And Figs. 8 and 9 are detail views of one of the cylinder blanks on which the machine is designed to operate, Fig. 8 being an end view and Fig. 9 a longitudinal section.

Referring to the drawings, 11 is the base of the machine; 12 is the main carriage to which the boring tool is secured; 13 is the housing of the chuck which clamps and rotates the blank 14; 15 (Fig. 2) is the carriage or slide of one of the tools which moves transversely of the axis of the blank for facing or grooving one end thereof; 16 (Fig. 1) is the carriage of the other of the facing tools which also moves transversely of the axis of the blank for facing or grooving the other end thereof; and 17 is the loading table which supports the blanks during loading and unloading.

The main carriage 12 of the tool on which the boring tool 18 (Fig. 3) is mounted, is moved back and forth on the guides 19 and 20 by means of the oil cylinder 21 mounted on the carriage and provided with a plunger 22 whose rear end is secured to the abutment 23 forming part of the base of the machine. The pump for operating the oil cylinder is driven from the motor 24, such pump and the control means for governing the movements of the carriage not being shown in Fig. 3.

The chuck which carries the blank 14 is opened and closed from the hand wheel 25 and the chuck is suitably driven to rotate the blank by a motor (not shown) preferably located at one end of the machine. The chuck and the mechanism for rotating it are similar to that shown in my copending application, Serial No. 134,622, of even date herewith. Chucks and driving means for rotating blanks like the blank 14 are well known in the art, and it will be understood that any suitable mechanism may be employed.

One form of blank 14 which the machine is designed to bore and face is shown in Figs. 8 and 9. While the tool 18 (Fig. 3) is boring out the interior of the blank, the groove 26 is machined by a tool 27 (Fig. 2) carried by the carriage 15 and the surface 27a is being faced by a tool 28 on the carriage 16 (Fig. 1). The cylinder 14 happens to be a brake cylinder and has a base 29, but it will be understood that the machine is not limited to the finishing of any particular cylinder design, and that the facing operations may be modified to meet requirements. In some cases, only one end of the cylinders will require facing or recessing as at 26, and in other cases recesses like 26 may be cut at both ends of the cylinder and such recesses may be of different forms depending on requirements.

The table 17 is utilized in loading and unloading the chuck. It is vertically adjustable, and therefore, may always be positioned so that the center line of the blank resting on the table is in alinement with the axis of rotation of the chuck. It is thus easy to push the blank into center position in the chuck preliminary to clamping by the chuck jaws. After the blank is machined, it may be easily pulled out onto the table after the chuck jaws are released. The unloading and loading steps may be accomplished in the interval in which the carriage 12 is being moved to the rear bringing the boring tool into position for the next cut. This insures a rapid operating cycle, since the removal and replacement of the blanks can be accomplished quickly, incident to the convenience of handling and centering them on the loading table, as above described. The table is of the form indicated in Figs. 1 and 4 and comprises the top plate on which the blanks are placed, the hollow web portion 30 and the flanges 31, 31 which are slotted and carry the four clamping bolts 32 threaded into the frame casting of the machine. When the clamping bolts are loosened, the table may be adjusted up and down by a screw 33 which is threaded through the lug 34 on the frame casting and has a handle 35 at its upper end, a ball thrust bearing 36 being provided between the collars 37 and 38, the latter of which is pinned to the screw.

The carriage or slide 16 which carries the tool 28 for facing the end surface of the blank includes a plate 39 engaged on its lower side by the dovetail guide 40, the guide forming a part of the frame casting 41 which is mounted on the base of the machine, as indicated in Fig. 1. The casting 41 is hollow and carries therein the mechanism for reciprocating the plate 39. This mechanism includes a cam drum 42 mounted on the shaft 43 and having a cam slot engaged by a roller 44 carried by the post 45 whose flange is bolted to the slide 39. The shaft 43 and its cam drum are driven from an electric motor 45a, bolted to the casting 41, through the intermediary of the worm wheel and worm 46 and 47 and a sprocket chain 48 passing around sprockets on the motor shaft and the shaft of the worm 47. In this manner, the slide 39 and its facing tool are reciprocated to carry the tool across the end surface of the blank, this movement being suitably timed in relation to the boring of the blank and the facing or recessing of its other end.

The carriage or slide 15 which carries the facing or recessing tool 27 is mounted on a casting 49 bolted to the top of the machine base 11. The slide has a dovetail connection with the casting 49 (Fig. 7) and carries on its under side (Fig. 6) a rack block 50 which is clamped to the slide by a pair of bolts 51, which extend through the plate 52 mounted for limited longitudinal adjustment on the top of the slide. The block is adjustable longitudinally of the slide by a screw 53 whose rear end is swivelled in the end of the slide and provided with a handle 54. The slide or carriage 15 is automatically reciprocated in timed relation with the movements of the carriage 12 by means of a shaft 55 extending longitudinally of the line of travel of the carriage 12 and provided at one end with a pinion 56 which engages the rack on the block 50. The other end of the shaft is journalled in a bearing 57 on the carriage 12, and intermediate the ends of the shaft is a transverse stud bolt carrying a roller 58. This roller is engaged by a cam slot 59 in the plate 59a bolted to the carriage 12 and so shaped that the shaft is rocked back and forth by the reciprocation of the carriage 12, thus causing the reciprocation of the slide 15 carrying the recessing or facing tool 27. In cutting the recess or groove 26 in the blank, as shown in Fig. 9, the tool 27 starts from its inner position and cuts outward as the carriage 12 moves to the left (Fig. 2) to bore out the blank. On the return movement of the carriage to the right, the tool 27 is moved inward to clear the groove or recess, and occupies such position until it is time for the grooving of the next blank, at which time the carriage 12 is in its starting position to the right. The character of the movement of the slide 15 and its tool are varied by using cam plates 59a having different cam grooves, such plates being removably bolted to the carriage 12, as shown. The operations of the transversely operating tools 27 and 28 are so timed that the ends of the blank are machined during the forward movement of the boring tool, and the time interval during which the boring tool is being retracted, is utilized in removing the finished blank and replacing it by another one.

It will be seen that this practically continuous operation of the machine is made possible by the arrangement whereby the blanks may be positioned and removed from one side of the chuck and the boring operation carried on from the other side, and that this procedure is greatly facilitated by the provision of the adjustable loading table 17.

What I claim is:

1. In combination in a horizontal boring machine, a chuck adapted to clamp and rotate a cylindrical blank about the axis thereof, a carriage mounted on the machine on one side of the chuck for movement longitudinally of said axis and provided with a tool for boring out the blank, loading means for the chuck on the side thereof opposite to that on which the carriage is located, and a second carriage located on the loading side of the chuck movable transversely of the axis of rotation of the chuck and provided with a tool for machining the end of the blank.

2. In combination in a horizontal boring machine, a chuck adapted to clamp and rotate a cylindrical blank about the axis thereof, a carriage mounted on the machine on one side of the chuck for movement longitudinally of said axis and provided with a tool for boring out the blank, a loading table on the side of the chuck opposite to that on which the carriage is located adapted to slidably support the blank in transferring it to the chuck, a second carriage on the machine on the side of the chuck adjacent the first carriage movable transversely of the axis of rotation of the chuck and provided with a tool for machining the end of the blank, a third carriage on the machine on the side of the chuck remote from the second carriage movable transversely of the axis of rotation of the chuck and provided with a tool for machining the end of the blank, and means for moving the third carriage back and forth.

3. In combination in a horizontal boring machine, a chuck adapted to clamp and rotate a cylindrical blank about the axis thereof, a carriage mounted on the machine on one side of the chuck for movement longitudinally of said axis and provided with a tool for boring out the blank, a second carriage intermediate the first carriage and the chuck movable transversely of the axis of rotation of the chuck and provided with a tool for machining the end of the blank, a shaft extending along the line of movement of the first carriage and adapted by oscillation about its axis to move the second carriage back and forth, and interacting cam means between the shaft and the first carriage whereby the reciprocation of such carriage oscillates the shaft.

4. In combination in a horizontal boring machine, a chuck adapted to clamp and rotate a cylindrical blank about the axis thereof, a carriage mounted on the machine on one side of the chuck for movement longitudinally of said axis and provided with a tool for boring out the blank, a second carriage intermediate the first carriage and the chuck movable transversely of the axis of rotation of the chuck and provided with a tool for machining the end of the blank, a shaft extending along the line of movement of the first carriage having a pinion and rack connection with the second carriage so that oscillation about its axis moves such carriage in and out, and interacting cam means between the shaft and the first carriage whereby the reciprocation of such carriage oscillates the shaft.

5. In combination in a horizontal machine, a chuck adapted to clamp and rotate a cylindrical blank about the axis thereof, a carriage mounted on the machine on one side of the chuck for movement longitudinally of said axis and provided with a tool for boring out the blank, a second carriage intermediate the first carriage and the chuck movable transversely of the axis of rotation of the chuck and provided with a tool for machining the end of the blank, a shaft extending along the line of movement of the first carriage and adapted by oscillation about its axis to move the second carriage back and forth, an abutment projecting laterally from the shaft, and a cam slot on the first carriage receiving said abutment and formed so that the reciprocation of the first carriage oscillates the shaft.

6. In combination in a horizontal boring machine, a chuck adapted to clamp and rotate a cylindrical blank about the axis thereof, a carriage mounted on the machine on one side of the chuck for movement longitudinally of said axis and provided with a tool for boring out the blank, a loading table on the side of the chuck opposite to that on which the carriage is located adapted to slidably support the blank in transferring it to the chuck, a second carriage on the machine on the side of the chuck adjacent the first carriage movable transversely of the axis of rotation of the chuck and provided with a tool for machining the end of the blank, means operated by the reciprocation of the first carriage for moving the second carriage back and forth, a third tool carriage on the machine on the side of the chuck remote from the second carriage movable transversely of the axis of rotation of the chuck and provided with a tool for machining the other end of the blank, and means for moving the third carriage back and forth.

7. In combination in a horizontal boring machine, a chuck adapted to clamp and rotate a cylindrical blank about the axis thereof, a carriage mounted on the machine on one side of the chuck for movement longitudinally of said axis and provided with a tool for boring out the blank, a loading table on the side of the chuck opposite to that on which the carriage is located adapted to slidably support the blank in transferring it to the chuck, a second carriage on the machine on the side of the chuck adjacent the first carriage movable transversely of the axis of rotation of the chuck and provided with a tool for machining the end of the blank, means operated by the reciprocation of the first carriage for moving the second carriage back and forth, a third tool carriage on the machine on the side of the chuck remote from the second carriage movable transversely of the axis of rotation of the chuck and provided with a tool for machining the other end of the blank, and power means independent of the means for operating the first and second carriages for operating said third carriage.

ROBERT L. HIBBARD.